US009030447B2

(12) United States Patent
Hsu

(10) Patent No.: US 9,030,447 B2
(45) Date of Patent: May 12, 2015

(54) SURFACE ACOUSTIC WAVE TOUCH PANEL AND MANUFACTURING METHOD THEREOF

(75) Inventor: Chia-Ling Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 701 days.

(21) Appl. No.: 13/397,700

(22) Filed: Feb. 16, 2012

(65) Prior Publication Data
US 2013/0169599 A1    Jul. 4, 2013

(30) Foreign Application Priority Data
Dec. 29, 2011   (TW) .............................. 100149474 A

(51) Int. Cl.
*G06F 3/043*   (2006.01)
(52) U.S. Cl.
CPC .............. *G06F 3/043* (2013.01); *G06F 3/0436* (2013.01); *Y10T 29/42* (2015.01)

(58) Field of Classification Search
USPC .................... 345/173, 177; 178/18.01, 18.04; 310/313 R, 342
See application file for complete search history.

(56) References Cited

U.S. PATENT DOCUMENTS 8,854,339 B2 * 10/2014 Kent et al. ..................... 345/177

* cited by examiner

*Primary Examiner* — Abbas Abdulselam
(74) *Attorney, Agent, or Firm* — Novak Druce Connolly Bove + Quigg LLP

(57) ABSTRACT

A surface acoustic wave touch panel includes a flexible substrate, an acoustic wave transmitting layer, an adhering layer, a piezoelectricity layer, and an electrode layer. The acoustic wave transmitting layer is made of nano-diamond and formed on the flexible substrate. The adhering layer is formed on the acoustic wave transmitting layer. The piezoelectricity layer is formed on the acoustic wave transmitting layer in an interdigitated electrode pattern. The electrode layer is formed on the piezoelectricity layer. A method of manufacturing the surface acoustic wave touch panel is also provided.

10 Claims, 6 Drawing Sheets

SURFACE ACOUSTIC WAVE TOUCH PANEL AND MANUFACTURING METHOD THEREOF

BACKGROUND

1. Technical Field

The present invention relates to a surface acoustic wave touch panels and a manufacturing method thereof.

2. Description of Related Art

The acoustic wave touch panels are made from glasses, thus are fragile and easily damaged. This characteristic also leads to difficulties in manufacture.

What is needed, therefore, is a surface acoustic wave touch panel and a manufacturing method of the surface acoustic wave touch panel, which could overcome the limitations described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
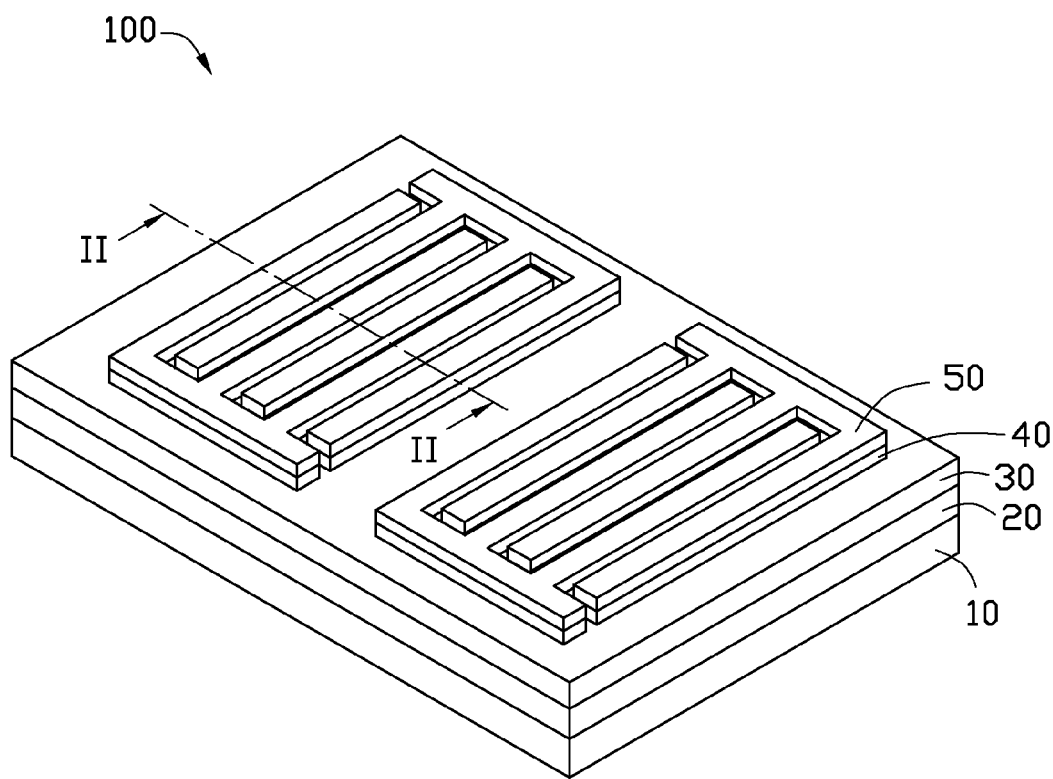
FIG. 1 is an isometric view of a surface acoustic wave touch panel according to an embodiment.
Figure 2:
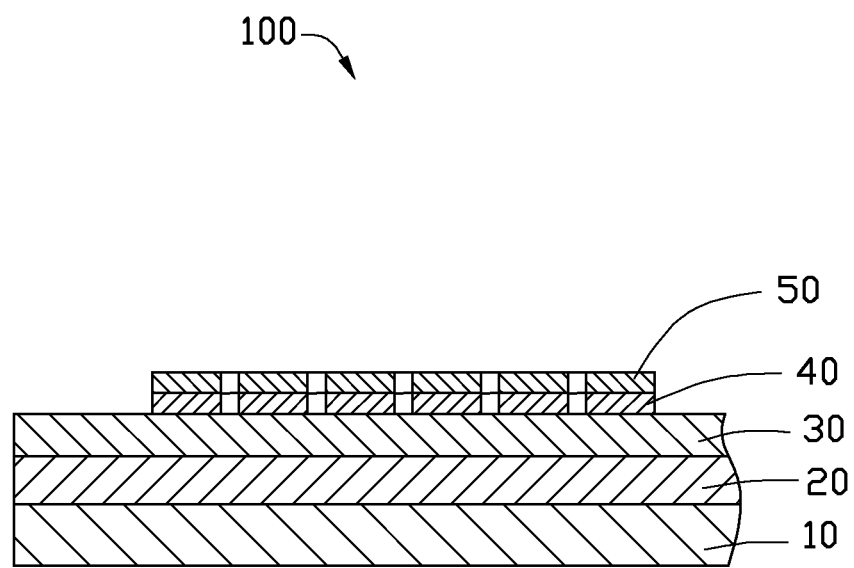
FIG. 2 is a partial sectional view of the surface acoustic wave touch panel, taken along line II-II of FIG. 1.

FIGS. 1 and 2, a surface acoustic wave touch panel 100 according to an embodiment is shown. The touch panel 100 includes a flexible substrate 10, an acoustic wave transmitting layer 20, an adhering layer 30, a piezoelectricity layer 40, and an electrode layer 50 stacked in turn.

The flexible substrate 10 is made of polyethylene terephthalate (PET), polyethersulfone (PES) or other flexible transparent material.

The acoustic wave transmitting layer 20 is made of nano-diamond. The height of the acoustic wave transmitting layer 20 is about 3 micro-millimeters to about 5 micro-millimeters. The elastic coefficient of the nano-diamond is high to produce a rapid transmission speed for the acoustic wave and a low signal loss ratio.

The adhering layer 30 is made of $SiO_2$. The height of the adhering layer 30 is about 0.2 micro-millimeters. The piezoelectricity layer 40 is made of ZnO. As the adhering layer 30 and the piezoelectricity layer 40 are all made of oxide material, the adhering layer 30 connects the acoustic wave transmitting layer 20 and the piezoelectricity layer 40 firmly and with high integrity.

The height of the piezoelectricity layer 40 is about 1 micro-millimeter to about 2 micro-millimeters. The piezoelectricity layer 40 forms an interdigitated electrode pattern. The electrode layer 50 is formed on the piezoelectricity layer 40 and is made of indium tin oxide (ITO).

The substrate 10, the acoustic wave transmitting layer 20, the adhering layer 30, the piezoelectricity layer 40, and the electrode layer 50 are all made of transparent material.

FIGS. 3 to 6 show the manufacturing method of the surface acoustic wave touch panel 100.

Figure 3:
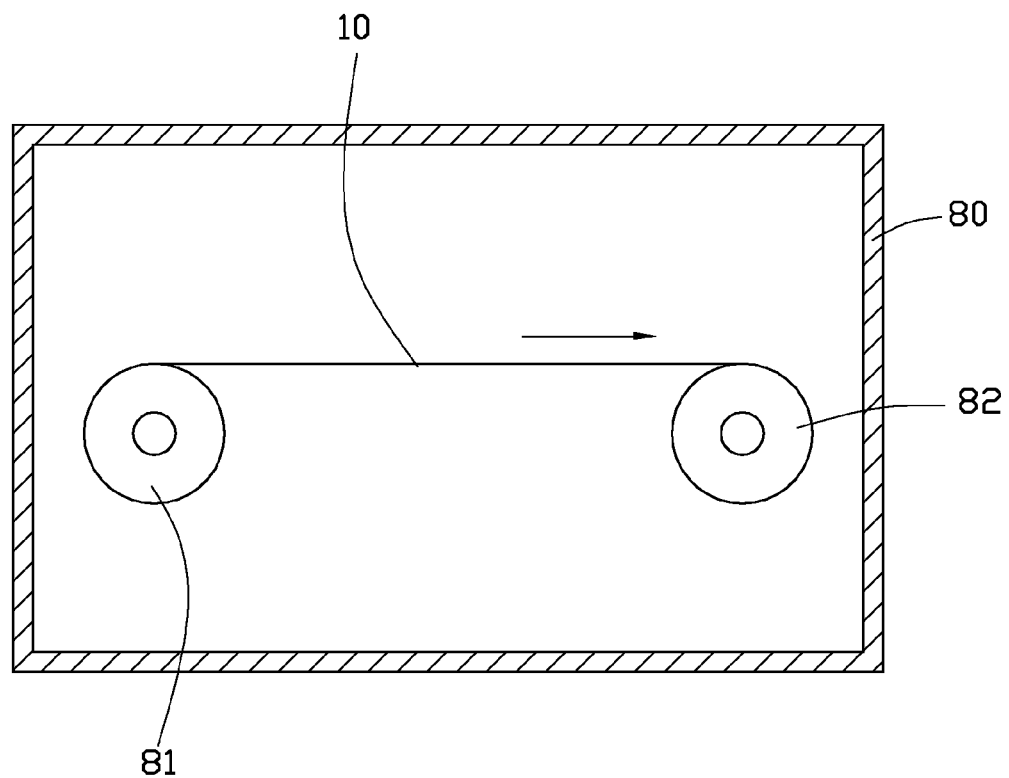
FIGS. 3-6 are schematic views showing the manufacturing method of the surface acoustic wave touch panel of FIG. 1.

FIG. 3 shows step 1 of the manufacturing method. In step 1, the substrate 10 is provided and cleaned. In detail, the substrate 10 is coiled on an unwinding shaft 81 in a plasma cleaning machine 80. One end of the substrate 10 is fixed on a rewinding shaft 82 away from the unwinding shaft 81. When cleaning, the substrate 10 is unwound from the unwinding shaft 81, the rewinding shaft 82 rewinds the substrate 10, and the substrate 10 is cleaned between the unwinding shaft 81 and the rewinding shaft 82 in the plasma cleaning machine 80.

Figure 4:
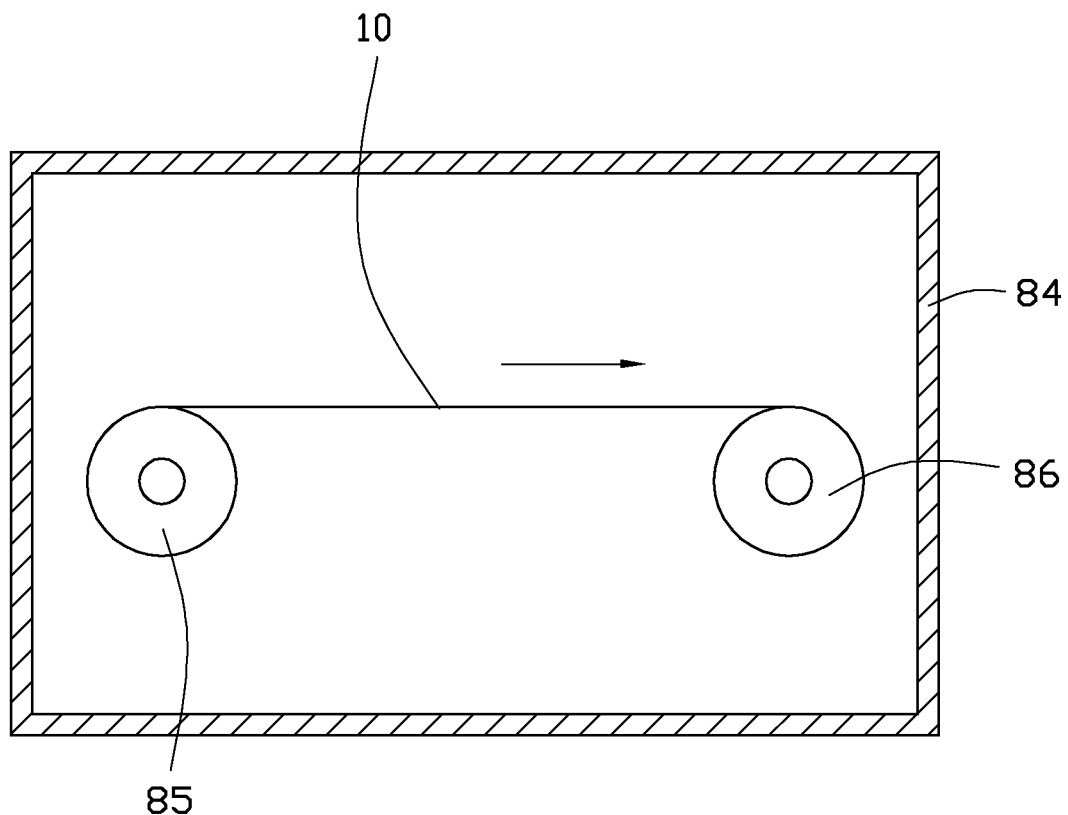

FIG. 4 shows step 2 of the manufacturing method. In step 2, the acoustic wave transmitting layer 20 made of nano-diamond is formed on the substrate 10. In detail, the acoustic wave transmitting layer 20 is formed on the substrate 10 by means of a spurting process. The substrate 10 is coiled on an unwinding shaft 85 in a spurting machine 84. One end of the substrate 10 is fixed on a rewinding shaft 86 away from the unwinding shaft 85. When subjected to spurting, the unwinding shaft 85 unwinds the substrate 10, the rewinding shaft 86 rewinds the substrate 10, and the acoustic wave transmitting layer 20 is formed on the substrate 10 between the unwinding shaft 85 and the rewinding shaft 86 in the spurting machine 84.

In step 3, the adhering layer 30 made of $SiO_2$ is formed on the acoustic wave transmitting layer 20 by means of a spurting process. In step 4, the piezoelectricity layer 40 is formed on the adhering layer 30 by means of the same spurting process. Steps 3 and 4 are similar to step 2, a detailed description is thus omitted here.

Figure 5:
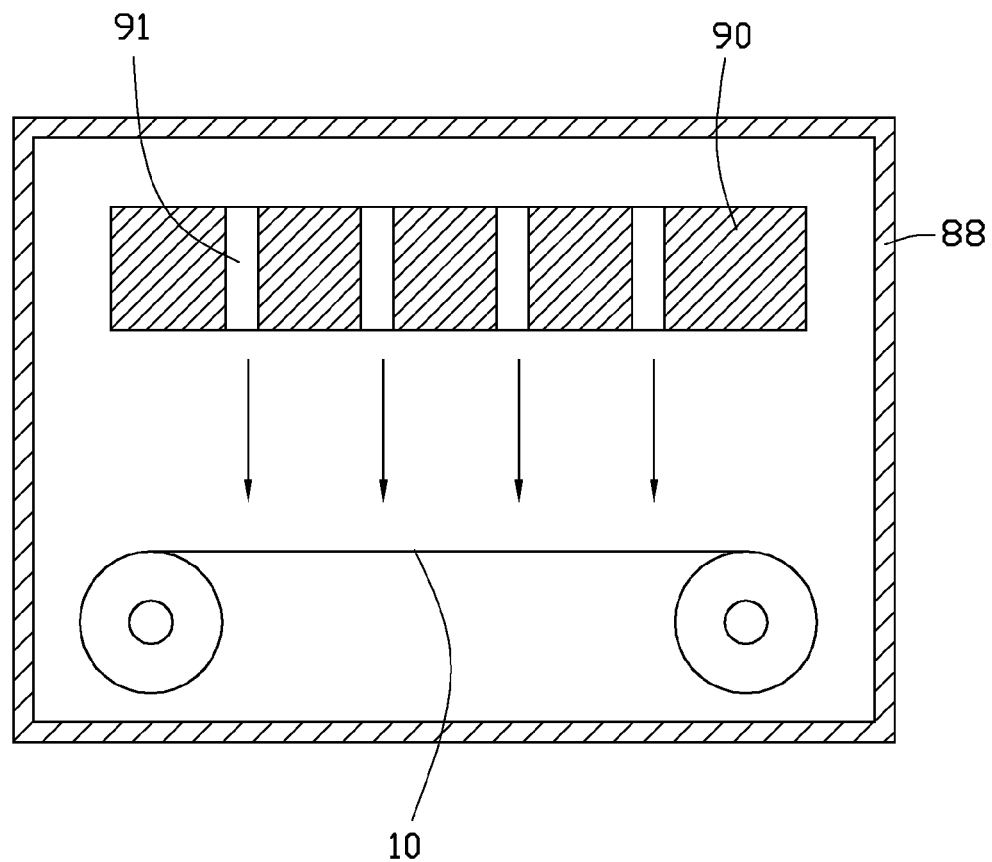

FIG. 5 shows step 5 of the manufacturing method. In step 5, an interdigitated electrode pattern is formed in the piezoelectricity layer 40 by means of a lithographic process. The substrate 10 formed with the piezoelectricity layer 40 is set in a lithography machine 88, and a mask 90 is placed above the substrate 10. The mask 90 defines a light transmitting area 91. The shape of the light transmitting area 91 corresponds to the interdigitated electrode pattern. Light is transmitted through the light transmitting area 91 to irradiate the piezoelectricity layer 40. As the piezoelectricity layer 40 is made of photosensitive material, the shape of the light transmitting area 91 is transfer-printed to the piezoelectricity layer 40. Then the piezoelectricity layer 40 is developed to remove portions of the piezoelectricity layer 40 which have not been irradiated to form the interdigitated electrode pattern.

Figure 6:
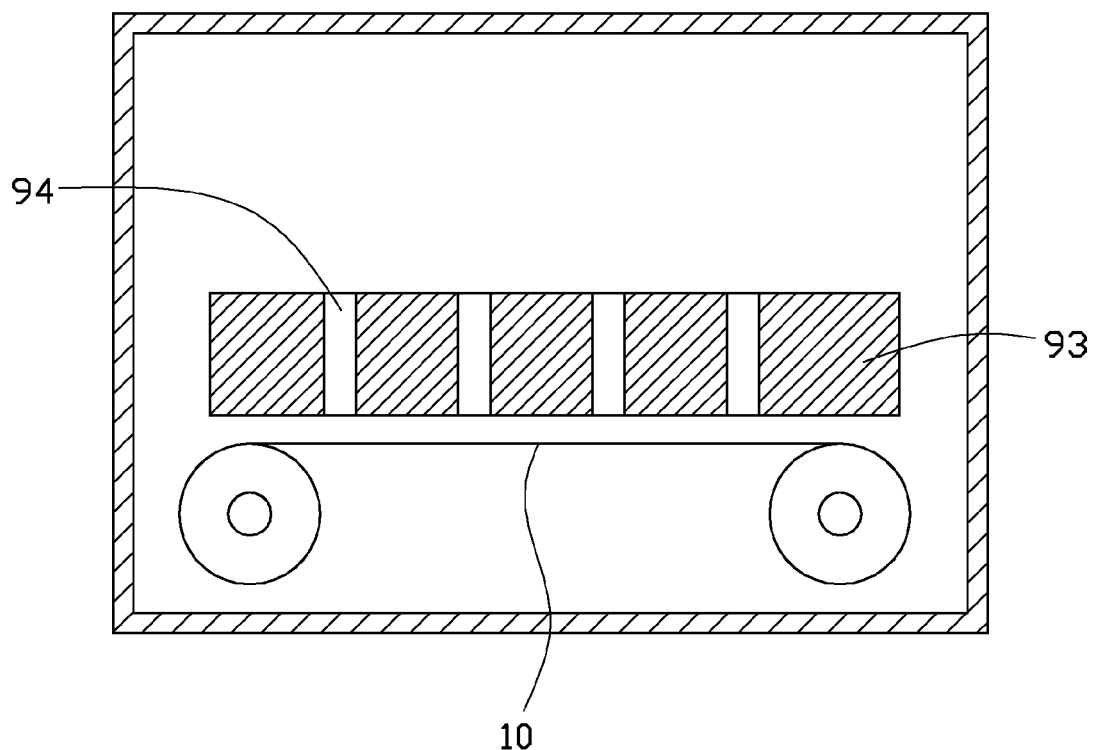

FIG. 6 shows step 6 of the manufacturing method. In step 6, the electrode layer 50 is formed on the piezoelectricity layer 40 by means of the spurting process. Step 6 and step 2 are similar except that, when spurting is taking place, a metal cover 93 is placed above the substrate 10. The metal cover 93 defines a through hole 94. The shape and the position of the through hole 94 is the same as that of the interdigitated electrode pattern formed on the piezoelectricity layer 40, to ensure that the electrode layer 50 is only formed on the piezoelectricity layer 40. After step 6, manufacture of the touch panel 100 is complete.

As the flexible substrate 10 is used to instead of glass(es) for manufacturing the touch panel 100, the touch panel 100 is more robust and far less likely to be damaged. Since the flexible substrate 10 is flexible, it can be coiled, it is easily stored and has good handleability in use, thus reducing the manufacturing cost.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A surface acoustic wave touch panel, comprising:
a flexible substrate;
an acoustic wave transmitting layer formed on the flexible substrate and made of nano-diamond;
an adhering layer formed on the acoustic wave transmitting layer;
a piezoelectricity layer formed on the acoustic wave transmitting layer and forming an interdigitated electrode pattern; and
an electrode layer formed on the piezoelectricity layer.

2. The touch panel of claim 1, wherein the adhering layer is made of $SiO_2$.

3. The touch panel of claim 1, wherein the flexible substrate is made of material selected from the group consisting of polyethylene terephthalate and polyethersulfone.

4. The touch panel of claim 1, wherein the piezoelectricity layer is made of ZnO.

5. The touch panel of claim 1, wherein the electrode layer is made of indium tin oxide.

6. A method for manufacturing surface acoustic wave touch panel, comprising steps of:
providing a flexible substrate;
forming an acoustic wave transmitting layer made of nano-diamond on the flexible substrate;
forming an adhering layer on the acoustic wave transmitting layer;
forming a piezoelectricity layer on the adhering layer, and forming an interdigitated electrode pattern in the piezoelectricity layer by means of lithographic process; and
forming an electrode layer on the interdigitated electrode pattern of the piezoelectricity payer.

7. The method of claim 6, wherein the acoustic wave transmitting layer, the adhering layer, the piezoelectricity layer, and the electrode layer are formed by means of spurting process.

8. The method of claim 7, wherein a metal cover is covered above the substrate when forming the electrode layer, the metal cover defines a hole, the shape and the position of the hole is the same as that of the interdigitated electrode pattern.

9. The method of claim 6, further comprising a step of cleaning the flexible substrate before forming the acoustic wave transmitting layer.

10. The method of claim 9, wherein in each step, the substrate is coiled on an unwinding shaft, one end of the substrate is fixed on a rewinding shaft spaced apart from the unwinding shaft, the unwinding shaft unwinds the substrate, and the rewinding shaft rewinds the substrate.

* * * * *